United States Patent
Kumar et al.

(10) Patent No.: US 11,749,070 B2
(45) Date of Patent: Sep. 5, 2023

(54) IDENTIFICATION OF ANOMALIES IN AN AUTOMATIC TELLER MACHINE (ATM) NETWORK

(71) Applicant: Bank of America Corporation, Charlotte, NC (US)

(72) Inventors: Ashok Kumar, Plano, TX (US); Jessica Boettner, Plano, TX (US); Kenneth M. Fischer, Austin, TX (US); Prabhakar Rao Bolleddu, Plano, TX (US); Carl Parziale, Charlotte, NC (US); Lakshmipriya Varada, Allen, TX (US)

(73) Assignee: Bank of America Corporation, Charlotte, NC (US)

( * ) Notice: Subject to any disclaimer, the term of this patent is extended or adjusted under 35 U.S.C. 154(b) by 392 days.

(21) Appl. No.: 16/850,649

(22) Filed: Apr. 16, 2020

(65) Prior Publication Data

US 2021/0327223 A1 Oct. 21, 2021

(51) Int. Cl.
  *G06Q 20/40* (2012.01)
  *G07F 19/00* (2006.01)
  *G06F 17/18* (2006.01)
  *H04L 9/40* (2022.01)

(52) U.S. Cl.
  CPC ............ *G07F 19/209* (2013.01); *G06F 17/18* (2013.01); *G07F 19/206* (2013.01); *G07F 19/211* (2013.01)

(58) Field of Classification Search
  CPC .... G07F 19/209; G07F 19/206; G07F 19/211; G06F 17/18
  See application file for complete search history.

(56) References Cited

U.S. PATENT DOCUMENTS

| | | | |
|---|---|---|---|
| 5,010,238 A | 4/1991 | Kadono et al. | |
| 5,253,167 A | 10/1993 | Yoshida et al. | |
| 6,157,614 A * | 12/2000 | Pasternak | H04L 12/5601 370/329 |
| 6,614,760 B1 * | 9/2003 | Suzuki | H04L 12/5601 370/244 |
| 10,395,199 B1 * | 8/2019 | Gibson | G06Q 10/04 |
| 2020/0019935 A1 | 1/2020 | Jan et al. | |

(Continued)

OTHER PUBLICATIONS

Autoregression Models for Time Series Forecasting with Python; Jason Brownlee,, https://machinelearningmastery.com/autoregression-models-time-series-forecasting-python; 45 pages, Jan. 2, 2017; Australia.

(Continued)

*Primary Examiner* — Bennett M Sigmond
*Assistant Examiner* — Bhavin D Shah
(74) *Attorney, Agent, or Firm* — Banner & Witcoff, Ltd.

(57) ABSTRACT

Aspects of the disclosure relate to monitoring an automatic teller machine (ATM) network and determining anomalous fault behavior in the ATM network. A computing device may determine historical fault volumes in the ATM network and generate a time-series model of the fault volumes. The computing platform may predict future fault volumes based on the generated time-series model. Based on the predicted future fault volumes and actual future fault volumes, the computing platform may determine anomalous fault behavior. The time-series model may be based on exogenous factors associated with ATM network operations.

18 Claims, 12 Drawing Sheets

(56) References Cited

U.S. PATENT DOCUMENTS

2020/0210393 A1* 7/2020 Beaver ............... G06F 17/18
2020/0394638 A1* 12/2020 Mcleod ............... G06Q 20/351

OTHER PUBLICATIONS

ARIMA Model—Complete Guide to Time Series Forecasting in Python, Selva Prabhakaran; https://www.machinelearningplus.com/time-series/arima-model-time-series-forecasting-python; 23 pages, Feb. 18, 2019.

A Gentle Introduction to SARIMA for Time Series Forecasting in Python; Jason Brownlee; https://machinelearningmastery.com/sarima-for-time-series-forecasting-in-python; 12 pages, Aug. 21, 2019; Australia.

What is Time Sseries Forecasting; Jason Brownlee; https://machinelearningmastery.com/time-series-forecasting 15 pages; Dec. 2, 2016; Australia.

Unboxing ARIMA Models; Madhav Mishra; https://towardsdatascience.com/unboxing-arima-models-1dc09d2746f8; 6 pages; Jun. 11, 2018.

Time Series Analysis in Python—A Comprehensive Guide with Examples; Selva Prabhakaran; https://www.machinelearningplus.com/time-series/time-series-analysis-python; 21 pages; Feb. 13, 2019.

* cited by examiner

| Parameter | Description | Possible values |
|---|---|---|
| p | Trend autoregression order | 0, 1, 2, 3, 4 |
| d | Trend difference order | 0, 1, 2 |
| q | Trend moving average order | 0, 1, 2 |
| P | Seasonal autoregression order | 0, 1, 2 |
| D | Seasonal difference order | 0, 1, 2 |
| Q | Seasonal moving average order | 0, 1, 2 |
| M | Time intervals in a single seasonal | 0, 1, 2 |
| Trend | ATM fault volume trend | None, constant, linear, linear with constant |

FIG. 2

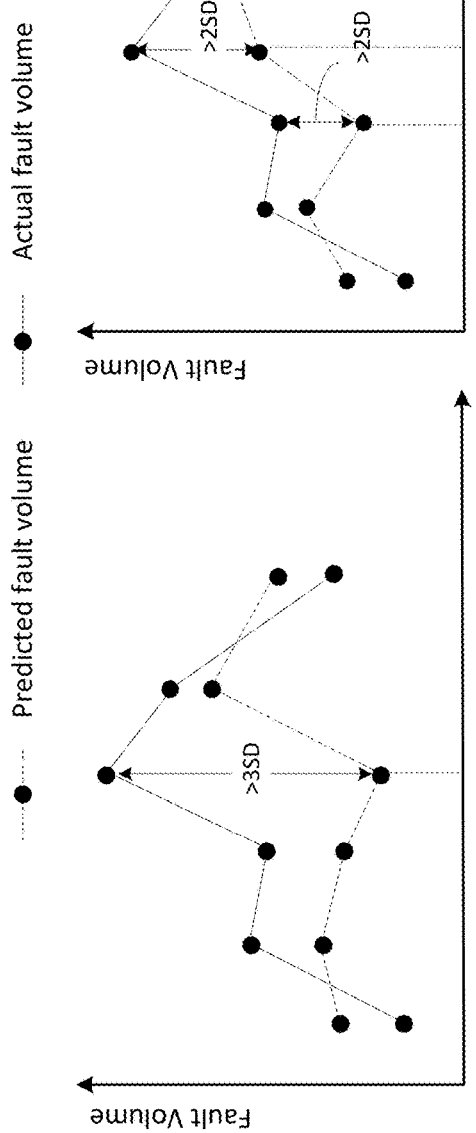
FIG. 5A
FIG. 5B
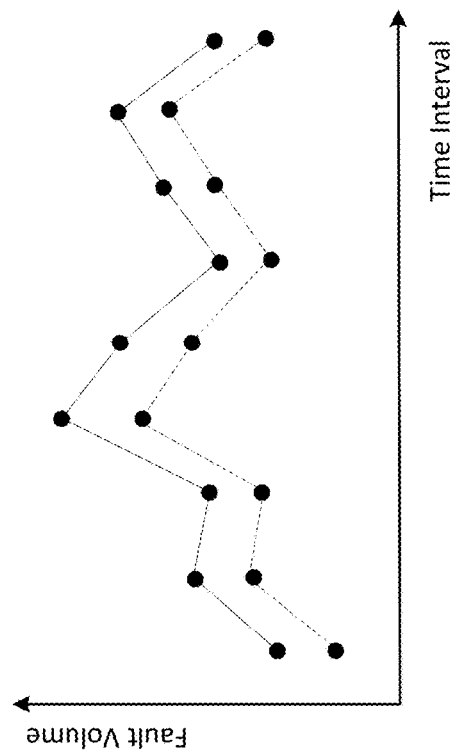
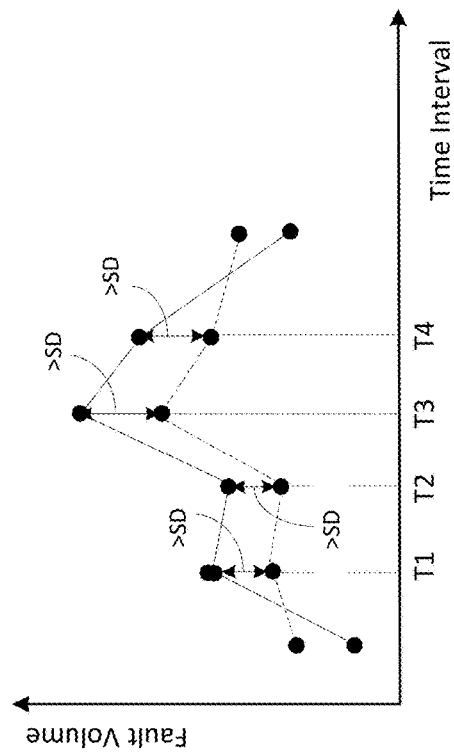
FIG. 5C
FIG. 5D

IDENTIFICATION OF ANOMALIES IN AN AUTOMATIC TELLER MACHINE (ATM) NETWORK

FIELD

Aspects described herein generally relate to monitoring operations of automatic teller machine (ATM) networks, and more specifically to analyzing ATM fault behavior.

BACKGROUND

ATM networks operated by banks provide various financial services for customers (e.g., cash withdrawal, deposits, account information, etc.). These networks, which may comprise thousands of ATMs for some larger banks, may be monitored for any potential issues (e.g., network outages, mechanical faults, etc.). Fault monitoring and diagnostic systems generally used by banks may provide status reports related to operation of an ATM network, but may require manual analysis to identify uncharacteristic behavior and underlying issues. As a result, there may be a considerable delay between onset of the issues, identification of the issues, and resolution. This may result in reduced service quality and higher downtimes.

SUMMARY

Aspects of the disclosure provide solutions that address and overcome technical problems associated with monitoring the functioning of ATM networks. In particular, one or more aspects of the disclosure relate generating a model for predicting faults in an ATM network, and based on the predicting, determining anomalies in operation of ATM networks.

In accordance with one or more arrangements, a computing platform having at least one processor, a communication interface, and memory may receive, corresponding to an ATM fault code and for the ATM network, observed fault volumes for a first set of time intervals. The computing platform may build, based on the observed fault volumes for the first set of time intervals, a seasonal autoregressive integrated moving average with exogenous factors (SARIMAX) model of fault volumes. The computing platform may determine, based on the SARIMAX model, predicted fault volumes for a second set of time intervals. The computing platform may determine observed fault volumes for the second set of time intervals. The computing platform may determine, based on the predicted fault volumes for the second set of time intervals and the observed fault volumes for the second set of time intervals, that one or more of the observed fault volumes for the second set of time intervals are anomalous. The computing platform may perform, based on the determining that the one or more of the observed fault volumes in the second set of time intervals are anomalous, a remedial action associated with the ATM fault code.

In some arrangements, the determining that the one or more observed fault volumes for the second set of time intervals are anomalous is based on at least one of: a difference between an observed fault volume and a predicted fault volume for a time interval in the second set being greater than a threshold value; differences between observed fault volumes and predicted fault volumes for at least two time intervals of three consecutive time intervals in the second set being greater than corresponding thresholds; differences between observed fault volumes and predicted fault volumes for at least four time intervals of five consecutive time intervals in the second set being greater than corresponding thresholds; or differences between observed fault volumes and predicted fault volumes for at least nine consecutive time intervals in the second set being all positive or all negative.

In some arrangements, the computing platform may determine a plurality of parameter combinations corresponding to a plurality of SARIMAX models. The computer platform may build, based on the observed fault volumes in the first set of time intervals, the plurality of SARIMAX models, each associated with a corresponding parameter combination. The computer platform may determine Akaike information criterion (AIC) values associated with each of the plurality of SARIMAX models. The computer platform may determine an intermediary SARIMAX model, among the plurality of SARIMAX models, with a lowest AIC value. The computer platform may determine, based on the intermediary SARIMAX model, that observed fault volumes in a first subset of time intervals, among the first set of time intervals, are outliers. The computer platform may generate corrected observed fault volumes for the first set of time intervals by replacing observed fault volumes in the first subset of time intervals with corrected values. The building the SARIMAX model of fault volumes may comprise using the corrected observed fault volumes for the first set of time intervals and a parameter combination associated with the intermediary SARIMAX model.

In some arrangements, each parameter combination of the plurality of parameter combinations may comprise: a corresponding trend autoregression order, a corresponding trend difference order, a corresponding trend moving average order, a corresponding seasonal autoregressive order, a corresponding seasonal difference order, a corresponding seasonal moving average order, a corresponding number of measurement intervals in a single season; and a corresponding trend.

In some arrangements, the computing platform may determine, based on the intermediary SARIMAX model, model fit fault volumes for the first set of time intervals. The determining that the observed fault volumes in the first subset of time intervals are outliers may comprise determining that differences between the observed fault volumes in the first subset of time intervals and model fit fault volumes in the first subset of time intervals are greater than a threshold.

In some arrangements, when a number of time intervals in the first subset is less than a threshold number of the number of time intervals, the corrected values may be the model fit fault volumes in the first subset of time intervals.

In some arrangements, when a number of time intervals in the first subset is greater than or equal to a threshold number of time intervals, the corrected values may be sums of the model fit fault volumes in the first subset of time intervals and a standard deviation of the observed fault volumes for the first set of time intervals.

In some arrangements, the exogenous factors may comprise one or more of: transaction volumes in the first set of time intervals and/or the second set of time intervals, numbers of software updates performed in the first set of time intervals in the ATM network, numbers of software updates scheduled for the second set of time intervals in the ATM network, days of week corresponding to the second set of intervals, months corresponding to the second set of time intervals, days of month corresponding to the second set of time intervals, or proximities of the second set of time intervals to holidays.

In some arrangements, the computing platform may determine an updated SARIMAX model based on the observed fault volumes for the first set of time intervals and the observed fault volumes for the second set of time intervals.

In some arrangements, the performing the remedial action associated with the ATM fault code comprises sending an alert message indicating the ATM fault code.

BRIEF DESCRIPTION OF THE DRAWINGS

The present disclosure is illustrated by way of example and not limited in the accompanying figures in which like reference numerals indicate similar elements and in which:

FIG. 2 shows various parameters associated with an autoregressive integrated moving average with exogenous factors (SARIMAX) model, in accordance with one or more example arrangements;

FIGS. 5A-5D shows example criteria that may be used to determine anomalous fault behavior in an ATM network, in accordance with one or more example arrangements;

DETAILED DESCRIPTION

Figure 1:
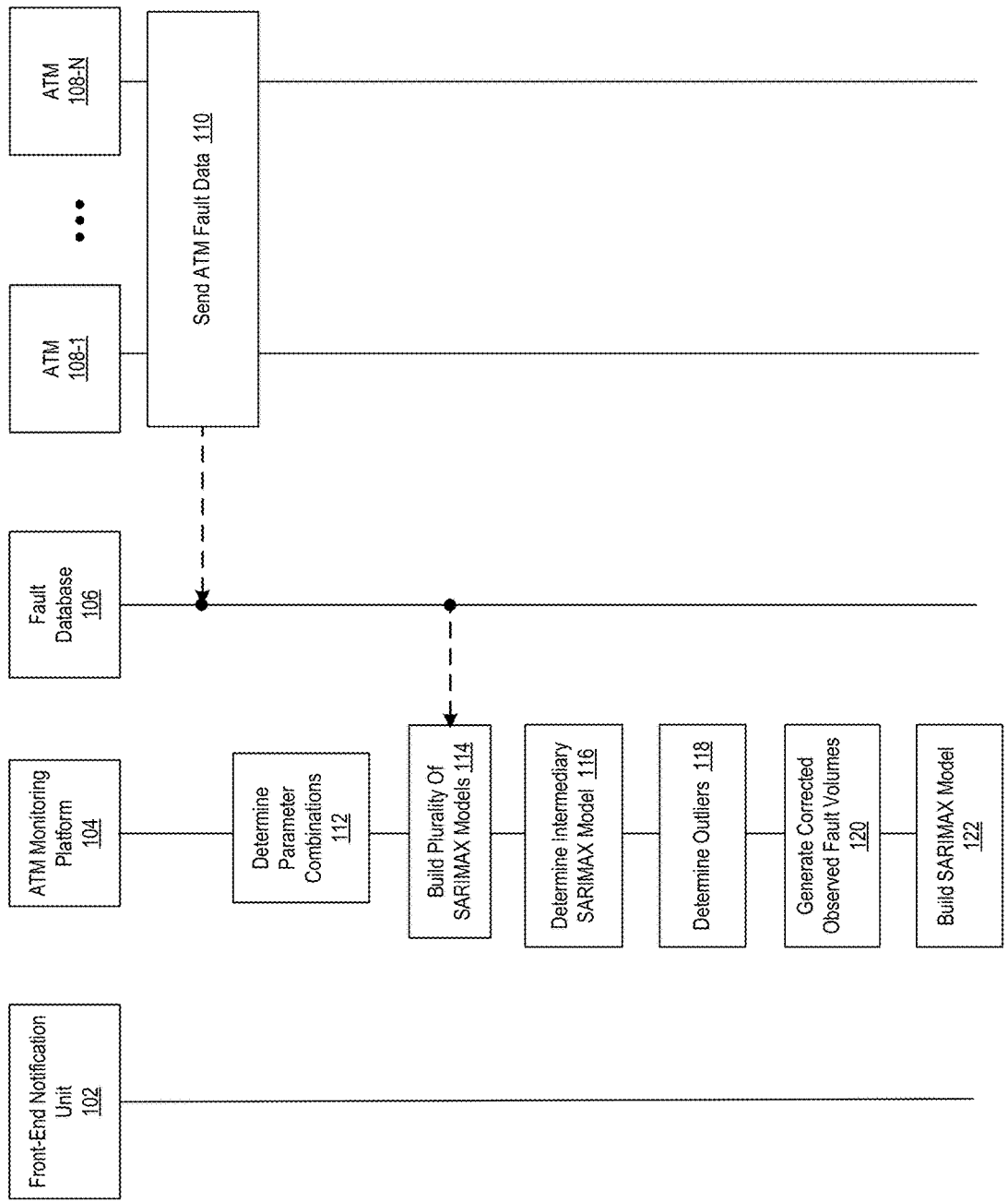
FIG. 1 shows an illustrative event sequence for building an ATM fault model, in accordance with one or more example arrangements.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Faults in an ATM network may be routine and part of operations. However, anomalous fault behavior may indicate underlying issues that may need resolution. Banking systems may track ATM fault volumes across the ATM network. Merely tracking ATM fault volumes may not, by itself, be sufficient to identify issues and/or may take considerable time for analysis. Various aspects of this disclosure relate to generating an ATM fault model to predict fault behavior and identifying anomalous fault behavior based on the predicted fault behavior and actual fault behavior.

Identifying anomalous behavior may be challenging, especially in light of a large number of factors that may contribute to ATM faults as well as the large number of ATM fault types that need to be analyzed. For example, ATM fault volumes may show variations over time that may be cyclical or may be dependent on exogenous factors such as holidays, day of the week, software update status, etc. Not accounting for these variations may result in false positives, wherein anomalous behavior may be flagged even though the fault volumes may be accounted for based on cyclical variations or exogenous factors. Various aspects of this disclosure further relate to accounting for seasonal variations and using various exogenous factors in an ATM fault model.

An ATM monitoring platform may receive, corresponding to an ATM fault code and for the ATM network, observed fault volumes for a first set of time intervals. The ATM monitoring platform may build, based on the observed fault volumes for the first set of time intervals, a seasonal autoregressive integrated moving average with exogenous factors (SARIMAX) model of fault volumes. The ATM monitoring platform may determine, based on the SARIMAX model, predicted fault volumes for a second set of time intervals and further determine observed fault volumes for the second set of time interval. The ATM monitoring platform may determine, based on the predicted fault volumes for the second set of time intervals and the observed fault volumes for the second set of time intervals, that one or more of the observed fault volumes for the second set of time intervals are anomalous. The ATM monitoring platform may perform, based on the determining that the one or more of the observed fault volumes in the second set of time intervals are anomalous, a remedial action associated with the ATM fault code.

Historical fault data (e.g., historical fault volumes) used to determine anomalous behavior may itself show unexpected behavior and may impact accuracy of predictions. Various aspects of this disclosure further relate to identifying outliers in the historical fault data, and replacing the outliers with corrected values to generate a more accurate model for future fault prediction.

A sequence of fault volumes, in consecutive time intervals, may be considered to be a time series and time series forecasting approaches may be used to predict future fault volumes. A time series forecasting approach comprises building a time series model based on historical values of the sequence (e.g., training values) and using the model to predict future values of the sequence.

An autoregressive integrated moving average (ARIMA) model of a time series y (e.g., a sequence of fault volumes) may be represented by a model equation:

$$Y_t = \alpha + (\beta_1 Y_{t-1} + \beta_2 Y_{t-2} + \ldots \beta_p Y_{t-p}) - (\theta_1 e_{t-1} - \theta_2 e_{t-2} - \ldots \theta_q e_{t-q}) \quad \text{Equation (1)}$$

where $(\beta_1 Y_{t-1} + \beta_2 Y_{t-2} + \ldots \beta_p Y_{t-p})$ is the autoregression (AR) component, and $(\theta_1 e_{t-1} - \theta_2 e_{t-2} - \ldots \theta_1 e_{t-2})$ is the moving average (MA) component. $Y_t, Y_{t-1}, Y_{t-2}, \ldots Y_{t-p}$ may correspond to model fit values of the time series or the model fit values with one or more differencing transformations applied. $e_{t-1}, e_{t-2}, \ldots e_{t-q}$ may correspond to errors between values of the time series y and the model fit values. Building the ARIMA model may comprise determining values of $\alpha$, $\beta_i$, and $\theta_i$ based on historical values of time series y (e.g., training values). The model equation may then be used to predict future values of the time series y.

A time series that exhibits a certain degree of periodicity with time may be said to be seasonal and a seasonal ARIMA (SARIMA) model may be used to model the time series. A SARIMA model equation may have additional terms (e.g., MA components, AR components) that apply seasonality to the ARIMA model. The additional terms may use values of Y corresponding to prior seasons in a model equation. With respect to ATM faults, for example, fault volumes may exhibit a weekly periodic behavior.

In an ATM network, other exogenous factors, such as: a transaction volume in the ATM network, a number of software updates/upgrades carried out in the ATM network (e.g., a number of ATMs in which software was updated), a day of the week, a month, a day of the month, a proximity to a holiday, etc., may also influence fault volumes. A seasonal autoregressive integrated moving average model with exogenous factors (SARIMAX) model may be used to account for the exogenous factors. A SARIMAX model equation may have additional terms that apply exogeneous factors. As described herein, an ATM monitoring platform may build a SARIMAX model of the historical fault volumes, and based on the SARIMAX model, predict fault volumes for future time intervals.

FIG. 1 shows an illustrative event sequence for building a SARIMAX model of fault volumes, in accordance with one or more example arrangements. At step 110, ATMs 108 in an ATM network associated with a bank may send, to a fault database 106, ATM fault data. The ATM fault data may comprise indications of one or more observed faults in the ATMs 108, corresponding fault codes, timestamps associated with the faults, indicators (e.g., identifiers) of the ATMs 108 reporting the faults, etc. ATM faults can be caused by a variety of issues (e.g., network issues, software issues, mechanical issues, etc.) and a fault code may indicate a corresponding issue. For example, ATM fault code 459 may indicate that the ATM 108 is disconnected from the network. Other ATM fault codes may be associated with a cash unit in the ATM being inoperable, a check deposit facility being unavailable, etc.

Fault data may be reported in real-time (e.g., as and when a fault is encountered at an ATM) or in batches (e.g., once every few minutes, few hours, day, etc.). The fault database 106 may store a series of historical (e.g., observed) fault volumes (e.g., y), associated with a fault code, corresponding to a set of time intervals. The time interval may be any period of time (e.g., 1 hour, 6, hours, 1 day, etc.). For example, the ATM fault data may indicate faults associated with the fault code 459, and the fault database 106 may store historical fault volumes associated with the fault code 459 for a plurality of days.

At step 112, the ATM monitoring platform 104 may determine a plurality of combinations of parameters that may be used for building a plurality of candidate SARIMAX models for a fault code. FIG. 2 shows various parameters associated with a SARIMAX model, in accordance with one or more example arrangements. Parameter p may be a trend AR order and may correspond to a number of AR terms in the SARIMAX model equation. Parameter d may be trend difference order and may correspond to a number of differencing transformations to be used in the series of historical fault volumes. Parameter q may be a trend MA order and may correspond to a number of MA terms in the SARIMAX model equation. Parameters P may be a seasonal AR order and may correspond to a number of AR terms in a seasonal part of the SARIMAX model equation. Parameter D may be trend difference order and may correspond to a number of seasonal differencing transformations to be used in the series of historical fault volumes. Parameters Q may be a seasonal MA order and may correspond to a number of MA terms in the seasonal part of the SARIMAX model equation. Parameter M may correspond to a number of time intervals in a single season.

The SARIMAX model equation may further account for an observed trend in the series of historical fault volumes (e.g., y). The trend may be "constant" if the values of y are approximately at a same level over time (e.g., $y \approx c$, where c is a constant). The trend may be "linear" if the values of y show a linear dependence with time (e.g., $y \approx at$, where a is a slope and t corresponds to time intervals). The trend may be "linear with constant" if the values of y show a linear dependence with time and have a baseline value (e.g., $y \approx at + c$). For all other situations, the trend may be classified as "none."

Each parameter may be associated with a corresponding set of possible values and building a SARIMAX model may comprise selecting a value for each parameter from the corresponding set. Parameter p may be selected from a set of values {0, 1, 2, 3, 4}, parameter d may be selected from a set of values {0, 1, 2}, parameter q may be selected from a set of values {0, 1, 2}, parameter P may be selected from a set of values {0, 1, 2}, parameter D may be selected from a set of values {0, 1, 2}, parameter Q may be selected from a set of values {0, 1, 2}, the parameter M may be selected from a set of values {0, 1, 2}, and parameter trend may be selected from the set {None, Constant, Linear, Linear with constant}. For example, a first candidate SARIMAX model may use the parameter combination p=0, q=0, d=0, P=0, Q=0, D=0, M=1, and trend=linear, and a second candidate SARIMAX model may use the parameter combination p=0, q=0, d=0, P=0, Q=0, D=0, M=1, and trend=constant. The above sets of values are merely exemplary and in other arrangements, different sets of values may be used.

At step 114, the ATM monitoring platform 104 may build, based on the plurality of combinations of parameters, a plurality of candidate SARIMAX models of the historical fault volumes of the fault code. For example, for each parameter combination, a corresponding candidate SARIMAX model of the historical fault volumes may be determined. Building the plurality of candidate SARIMAX models may comprise determining corresponding model fit fault volumes for the set of time intervals. For each candidate SARIMAX model, a corresponding fit quality parameter (e.g., an Akaike information criterion (AIC) value) may be determined. The fit quality parameter may indicate a measure of how closely the model fit fault volumes (e.g., based on a candidate SARIMAX model) correspond to the actual historical fault volumes. The AIC value may be determined using the equation:

$$AIC = -2 \ln(L) + 2(k_{exog} + k_{trend} + k_{AR} + k_{MA}) \quad \text{Equation (2)}$$

where $\ln(L)$ is a maximum value of the likelihood function, $k_{exog}$ are coefficients associated with the exogenous factors, $k_{trend}$ are the trend coefficients, $k_{AR}$ are the AR coefficients, and $k_{MA}$ are the MA coefficients.

The plurality of combinations of parameters may comprise every possible combination of values of the parameters. Alternatively, the plurality of combinations of parameters may comprise only a subset of every possible combination. For example, if a fit quality parameter is deteriorated (e.g., AIC value is increased) when a parameter value (e.g., of parameter p) is changed from 1 to 2, parameter value 1 is selected and other possible values (e.g., 2, 3, or 4) of the parameter need not be used for building the plurality of candidate SARIMAX models. This may reduce the computational load on the ATM monitoring platform 104.

At step 116, the ATM monitoring platform 104 may select, as an intermediary SARIMAX model, a SARIMAX model (among the plurality of candidate SARIMAX models) that results in a best model fit quality. The ATM monitoring platform 104 may select a SARIMAX model, for example, with a lowest AIC value.

At step 118, the ATM monitoring platform 104 may determine a subset of the historical fault volumes that are outliers. The outliers may be determined based on deviations between the historical fault volumes and the model fit fault volumes. For example, for the series of historical fault volumes y, a historical fault volume $y_k$ at time interval k may be considered as an outlier if a difference between $y_k$ and model fit fault volume $\hat{y}_k$ at the time interval k is greater than a threshold. The threshold may be determined based on a standard deviation (SD) of differences between historical fault volumes and model fit fault volumes. For example, the SD may be calculated as:

$$SD = \sqrt{\frac{\sum_{i=1}^{n}(z_i - \bar{z})^2}{n}} \quad \text{Equation (3)}$$

where $z_i$ is a difference between a historical fault volume at time interval i and a model fit fault volume at the time interval i, $\bar{z}$ is a mean difference between historical fault volumes and model fit fault volumes, and n is a number of time intervals corresponding to historical fault volumes under consideration. n may be less than or equal to a total number of time intervals corresponding to the historical fault volumes. For example, to determine whether the historical fault volume $y_k$ at time interval k may be considered as an outlier, n may be selected to be less than or equal to k (e.g., n=k−1).

In an arrangement, the historical fault volume $y_k$ in time interval k may be considered as an outlier if a difference between $y_k$ and the model fit fault volume $\hat{y}_k$ in the time interval k is greater than twice the SD value. In other arrangements, any other multiples of SD (e.g., 3, 4, etc.) may be used as thresholds.

At step 120, the ATM monitoring platform 104 may generate corrected historical fault volumes for the set of time intervals. Generating the corrected historical fault volumes may comprise replacing the first subset of historical fault volumes (e.g., comprising the outliers) with corrected values. The corrected values may be corresponding model fit fault volumes, or a function of the corresponding model fit fault volumes. For example, if fault volume $y_k$ at time interval k is determined to be an outlier, corrected historical fault volumes may comprise the series y with $y_k$ replaced by $\hat{y}_k$.

The corrected values may be determined based on a number of outliers. In an arrangement, if the number of outliers is less than a threshold number (e.g., <5% of all the historical fault volumes), the corrected values may be the corresponding model fit fault volumes. In an arrangement, if the number of outliers is greater than or equal to a threshold (e.g., ≥5% of all the historical fault volumes), the corrected values may be sums of the corresponding model fit fault volumes and the SD.

At step 122, the ATM monitoring platform 104 may build a SARIMAX model based on the corrected historical fault volumes. The SARIMAX model may use the same parameter combination as that used for the intermediary SARIMAX model. The ATM monitoring platform 104 may predict fault volumes for future time intervals based on the SARIMAX model.

The ATM monitoring platform 104 may build corresponding SARIMAX models for each fault code (e.g., using the steps 112-122). Building the SARIMAX models may comprise storing, in a memory associated with the ATM monitoring platform 104, the model constants (e.g., values of α, $β_i$, and $θ_i$, etc.) and/or the parameter combinations used for building the SARIMAX models.

Figure 3A:
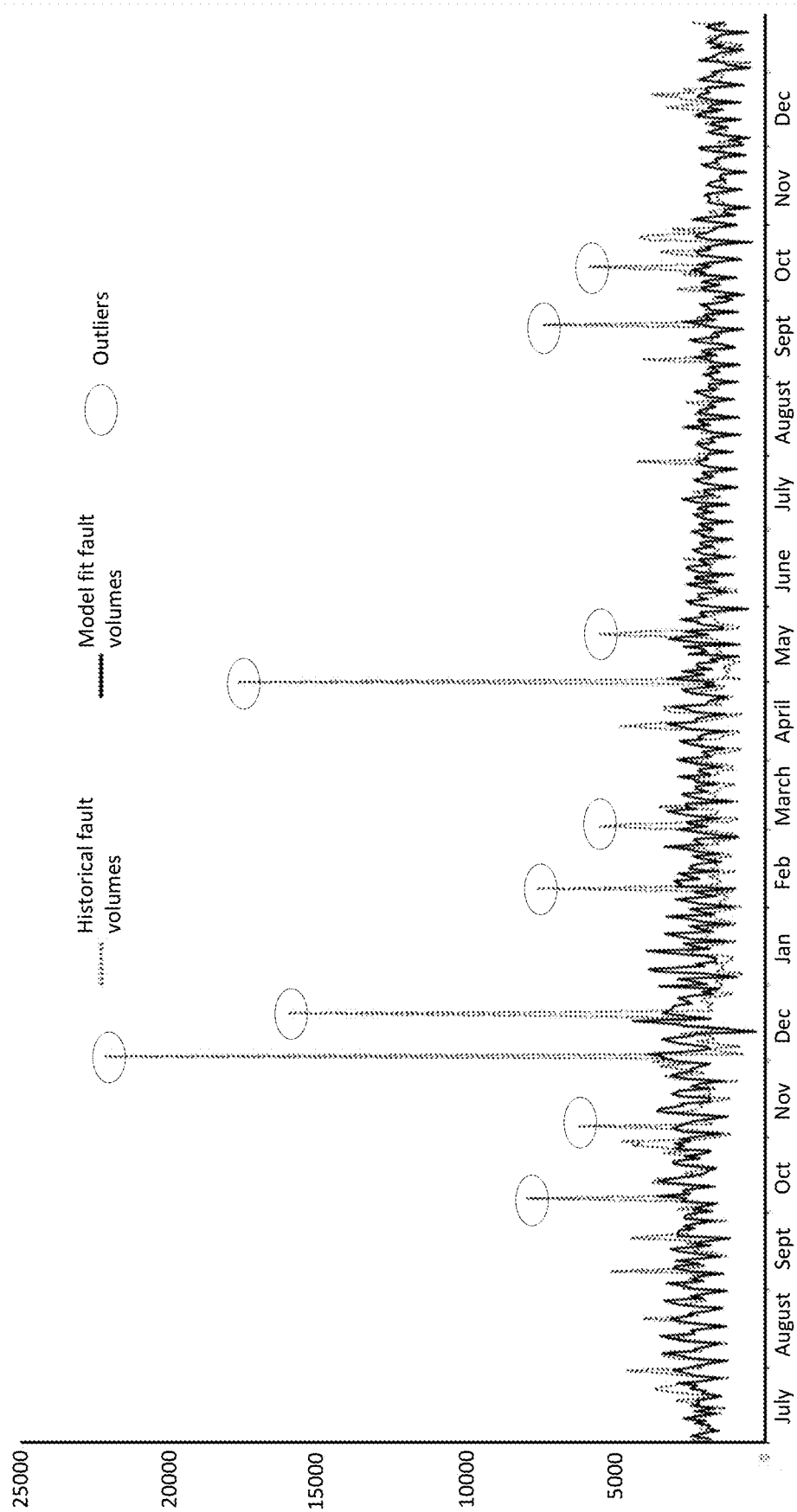
FIG. 3A shows example historical fault volumes and corresponding model fit fault volumes, associated with an ATM fault code, in accordance with one or more example arrangements.
Figure 3B:
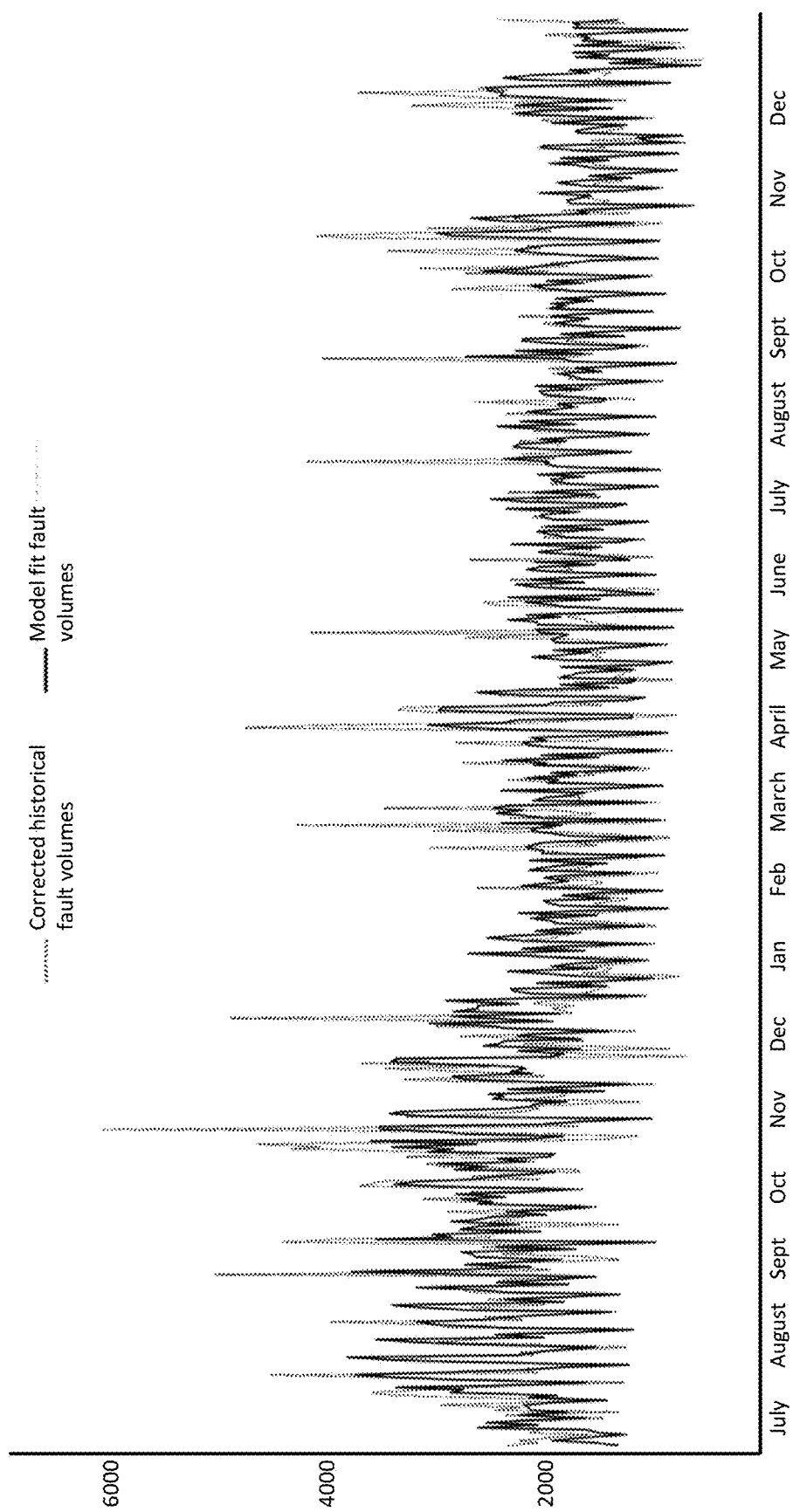
FIG. 3B shows example corrected historical fault volumes and corresponding model fit fault volumes, associated with an ATM fault code, in accordance with one or more example arrangements.

FIGS. 3A and 3B shows example operation of the ATM monitoring platform 104 for as applied for fault volumes, in accordance with one or more example arrangements. FIG. 3A shows historical fault volumes, associated with fault code 459, for a plurality of days. The ATM monitoring platform 104 may determine a plurality of candidate SARIMAX models and determine an intermediary SARIMAX model, among the plurality of SARIMAX models, that results in a lowest AIC value. The ATM monitoring platform 104 may determine model fit fault volumes based on the intermediary SARIMAX model. FIG. 3A shows model fit fault volumes determined based on the intermediary SARIMAX model. The model fit fault volumes based on the intermediary SARIMAX model show an error percentage of approximately 65%. The error percentage may be determined based on the equation:

$$\text{Error \%} = \frac{1}{n} \frac{\sum_{i=1}^{n}|y_i - \hat{y}_i|}{\sum_{i=1}^{n} y_i} \times 100 \quad \text{Equation (4)}$$

wherein $\hat{y}_i$ is a model fit fault volume for time interval i, $y_i$ is an actual fault volume for the time interval i, and n is a total number of time intervals corresponding to the historical fault volumes. The ATM monitoring platform may determine, based on considerations described above with reference to step 118, a subset of the historical fault volumes that are outliers (e.g., as highlighted in FIG. 3A). The outliers may be for example more than 3 SDs away from the corresponding model fit fault volumes.

The historical fault volumes that are outliers may be replaced by corresponding model fit fault volumes (e.g., determined based on the intermediary SARIMAX model) to generate corrected historical fault volumes. The ATM monitoring platform 104 may build, based on the corrected historical fault volumes and using a same parameter combination as that used for the intermediary SARIMAX model, a SARIMAX model.

FIG. 3B shows corrected historical fault volumes and model fit fault volumes associated with fault code 459. The model fit fault volumes may be determined based on the SARIMAX model built based on the corrected historical fault volumes. Using the corrected historical fault volumes to build the SARIMAX model results in an error percentage of about 20%, showing the improvement achieved by using the corrected historical fault volumes. The SARIMAX model may be used to determine the predicted fault volumes for upcoming days.

Figure 4:
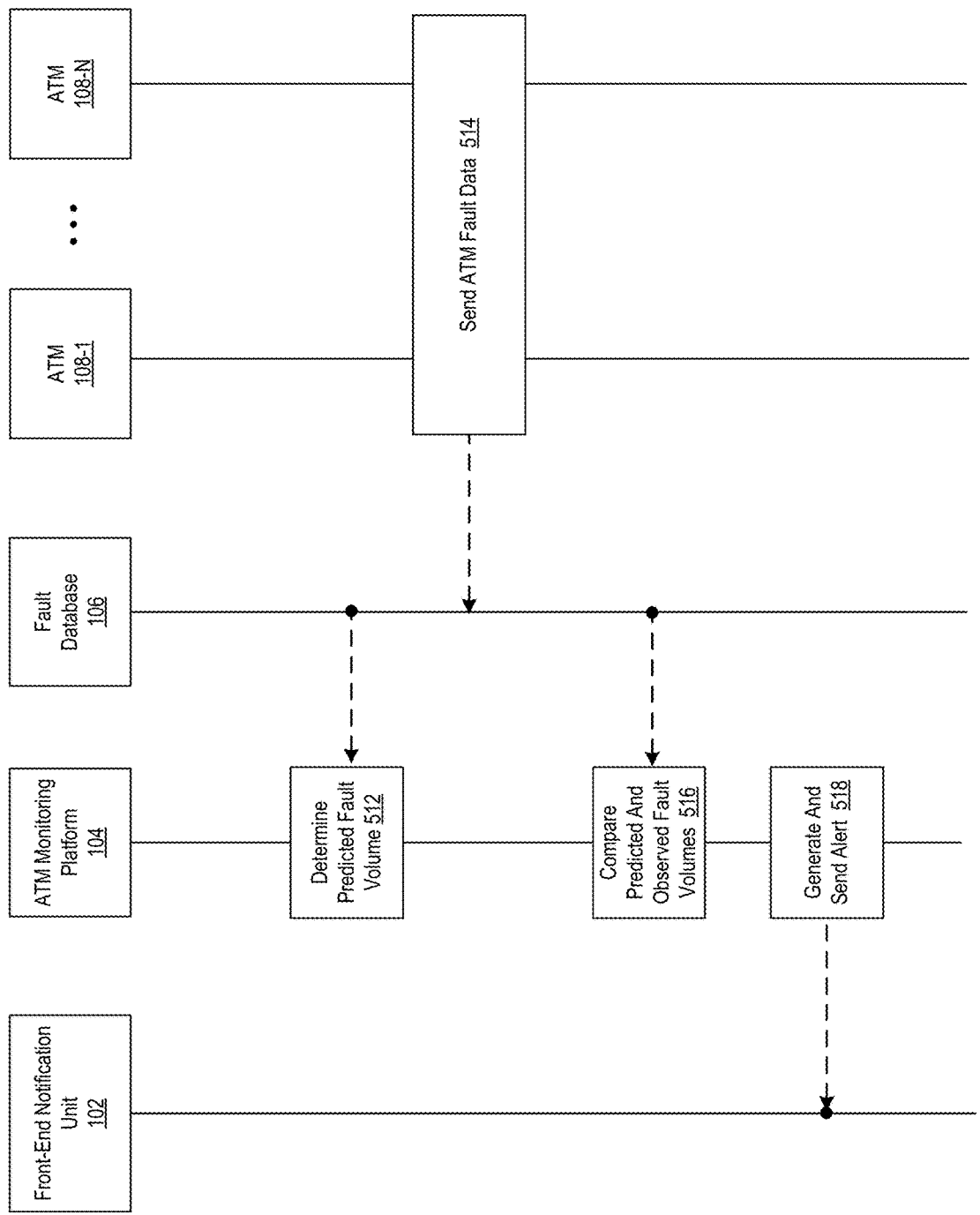
FIG. 4 shows an illustrative event sequence for determining anomalous fault behavior in an ATM network, in accordance with one or more example arrangements.

FIG. 4 shows an illustrative event sequence for determining anomalous fault behavior in an ATM network, in accordance with one or more example arrangements. At step 412, the ATM monitoring platform 104 may determine predicted fault volumes, corresponding to the ATM fault code, for one or more time intervals (e.g., future time intervals). The ATM monitoring platform 104 may use the SARIMAX model built at step 122 of FIG. 1. With reference to the above example for fault code 459, the ATM monitoring platform 104 may determine predicted fault volumes for the fault code 459 associated with one or more upcoming days.

At step 414, the ATMs 108 may send, to the fault database 106, ATM fault data corresponding to faults observed in the one or more time intervals. The fault database 106 may store, based on the ATM fault data, fault volumes observed in the one or more time intervals. For example, the fault database may store fault volumes, observed in the one or more upcoming days, associated with the fault code 459.

At step 416, the ATM monitoring platform 104 may compare the predicted fault volumes, as determined at step 412, with the observed fault volumes to determine anomalous behavior. The ATM monitoring platform 104 may, for example, calculate deviations between the predicted fault volumes and the observed fault volumes. If a deviation between a predicted fault volume and an observed fault volume for a time interval is greater than a threshold, the ATM monitoring platform 104 may determine that the observed fault volume is anomalous.

The ATM monitoring platform 104 may use SD of differences between the historical fault volumes and the model fit fault volumes (e.g., as determined using Equation (2)) to determine anomalous fault behavior. The SD may be updated after one or more of the observed fault volumes are determined and the updated SD may be used for future comparisons. For example, the SD calculation may additionally consider differences between the predicted fault volumes, as determined at step 412, and the observed fault volumes as determined at step 414. The ATM monitoring platform 104 may, compare the deviations between the predicted fault volumes and the observed fault volumes with the SD to determine anomalous fault behavior.

FIGS. 5A-5D shows example criteria that may be used to determine anomalous fault behavior based on observed fault volumes. If a deviation between a predicted fault volume and an observed fault volume for a time interval is greater than a threshold (e.g., three times an SD value), the ATM fault code may be determined to be showing anomalous fault volume in that time interval. Such an anomalous fault behavior may be referred to as a "peak anomaly." As shown in FIG. 5A, the ATM fault code may be determined to show an anomalous fault volume for time interval T1.

If deviations between predicted fault volumes and observed fault volumes for two (or three) time intervals in three consecutive time intervals exceed corresponding thresholds (e.g., two times an SD value) in a same direction, the ATM fault code may be determined to be showing anomalous fault volumes in the two (or three) time intervals. Such an anomalous fault behavior may be referred to as a "consecutive peak anomaly." As shown in FIG. 5B, the ATM fault code may be determined to show anomalous fault volumes for time intervals T1 and T2.

If deviations between predicted fault volumes and observed fault volumes for four (or five) time intervals in five consecutive time intervals exceed corresponding thresholds (e.g., an SD value) in a same direction, the ATM fault code may be determined to be showing anomalous fault volumes in the four (or five) time intervals. Such an anomalous fault behavior may be referred to as a "emergent trend anomaly." As shown in FIG. 5C, the ATM fault code may be determined to show anomalous fault volumes for time intervals T1, T2, T3, and T4.

If predicted fault volumes for nine (or more) consecutive time intervals all exceed corresponding observed fault volumes, or are all lower than the corresponding observed fault volumes, the ATM fault code may be determined to be showing anomalous fault volumes in the nine (or more) time intervals. Such an anomalous fault behavior may be referred to as a "mild trend anomaly." As shown in FIG. 5D, the ATM fault code may be determined to show anomalous fault behavior for time intervals shown. While FIGS. 5A-5D show some example criteria for determining anomalous behavior, in other examples other criteria may be used to determine the anomalous behavior. For example, a different number of time intervals may be considered and/or different thresholds (e.g., other multiples of SD) may be used.

Figure 6:
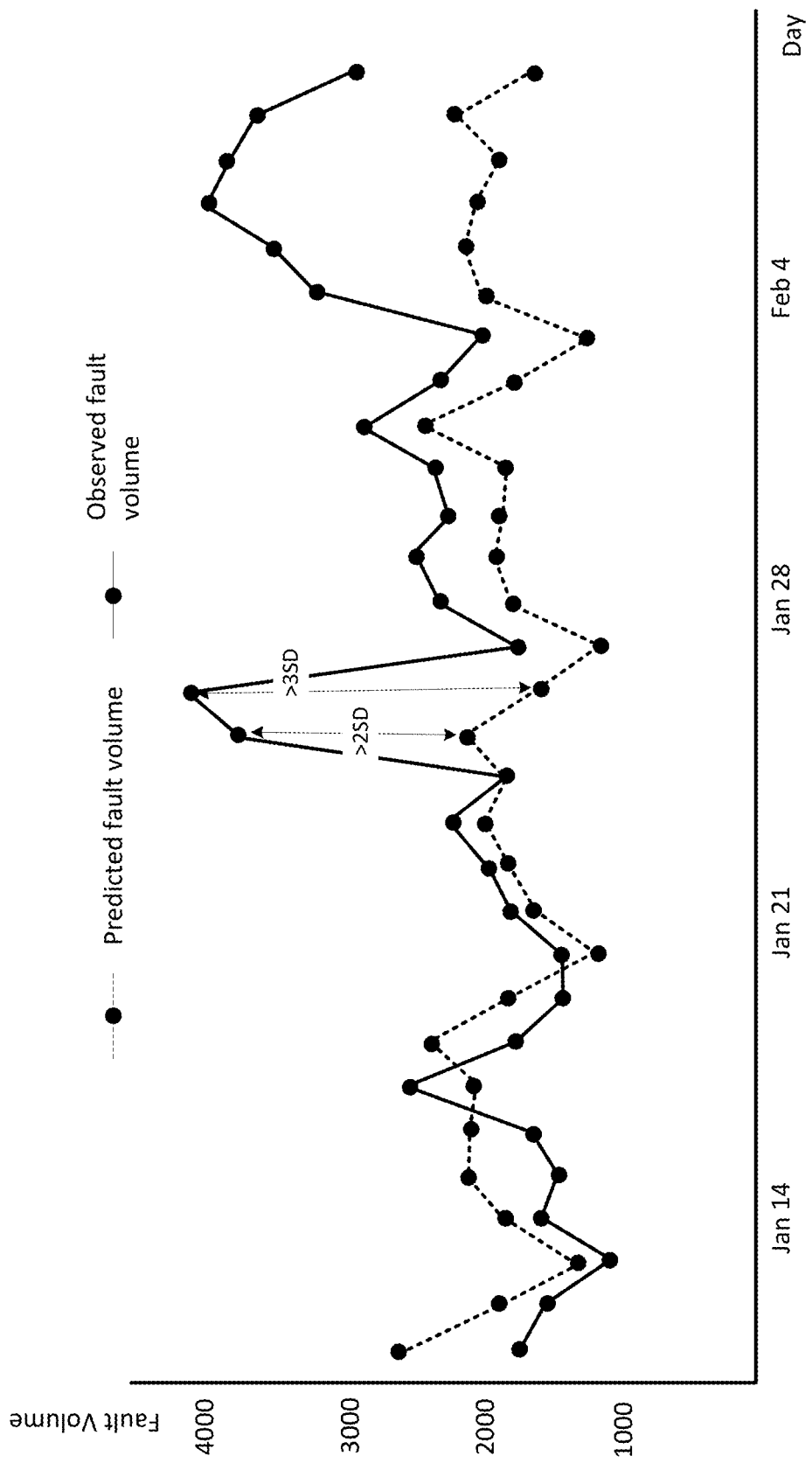
FIG. 6 shows an example comparison between predicted fault volumes and observed fault volumes, in accordance with one or more example arrangements.

Continuing with the example of fault code 459, FIG. 6 shows an example comparison between predicted fault volumes and observed fault volumes for some days in the months of January and February. On January 25, it may be determined that a deviation between a predicted fault volume and an observed fault volume exceeds two times an SD value (e.g., the SD value determined based on observed fault volumes until January 24). On January 26, it may be determined that a deviation between a predicted fault volume and an observed fault volume exceeds three times an SD value (e.g., the SD value determined based on observed fault volumes until January 25). The ATM monitoring platform 104 may determine that fault code 459 is showing anomalous fault behavior for the days January 25 and January 26, based on (i) the deviation on January 26 exceeding three times the SD value (peak anomaly) and (ii) the deviations on January 25 and January 26 exceeding two times the SD value (consecutive peak anomaly). On February 2, the ATM monitoring platform may further determine that the fault code 459 is showing anomalous fault behavior based on actual fault volumes exceeding predicted fault volumes for nine consecutive days (mild trend anomaly).

At step 418, the ATM monitoring platform 104 may generate and send an alert to the front-end notification unit 102 based on the comparison at step 416. For example, if the ATM monitoring platform determines that the fault code is associated with anomalous fault behavior, the ATM monitoring platform 104 may send an alert. The alert may indicate the fault code, the predicted fault volumes, the actual fault volumes, and/or a type of anomaly detected (e.g., peak anomaly, consecutive peak anomaly, mild trend anomaly, emergent trend anomaly, etc.).

The procedures of FIGS. 1 and 4 may be replicated for multiple fault codes being monitored by the ATM monitoring platform 104. For example, the ATM monitoring platform 104 may generate corresponding SARIMAX models for each fault code (e.g., using the procedure of FIG. 1) and determine whether observed fault volumes associated with the each fault code are associated with anomalous fault behavior. The ATM monitoring platform 104 may generate a report indicating all the fault codes, wherein the report may further indicate fault codes associated with anomalous fault behavior, predicted fault volumes, actual fault volumes, and/or types of anomaly detected. The report may further categorize fault data based on geographical locations of the ATMs, ATM manufacturers, ATM software versions, and/or the like. The ATM monitoring platform 104 may send the report to the front-end notification unit 102

The ATM fault monitoring platform 104 may rebuild the SARIMAX model based on the historical fault volumes (e.g., as received at step 110) and the observed fault volumes (e.g., as received at step 414) and use the rebuilt SARIMAX model for further future predictions. For example, the ATM monitoring platform 104 may rebuild the SARIMAX model after a fixed number of observed fault volumes are determined. For example, the ATM monitoring platform 104 may rebuild the SARIMAX model every 30 days. Rebuilding the SARIMAX model may comprise replacing the observed fault volumes with corrected values in accordance with the criteria described above with reference to steps 118 and 120 of FIG. 1. With reference to FIG. 5, for example, the ATM monitoring platform 104 may replace the observed fault volume for January 26 with corresponding predicted fault volume and rebuild the SARIMAX model for further future predictions.

Figure 7A:
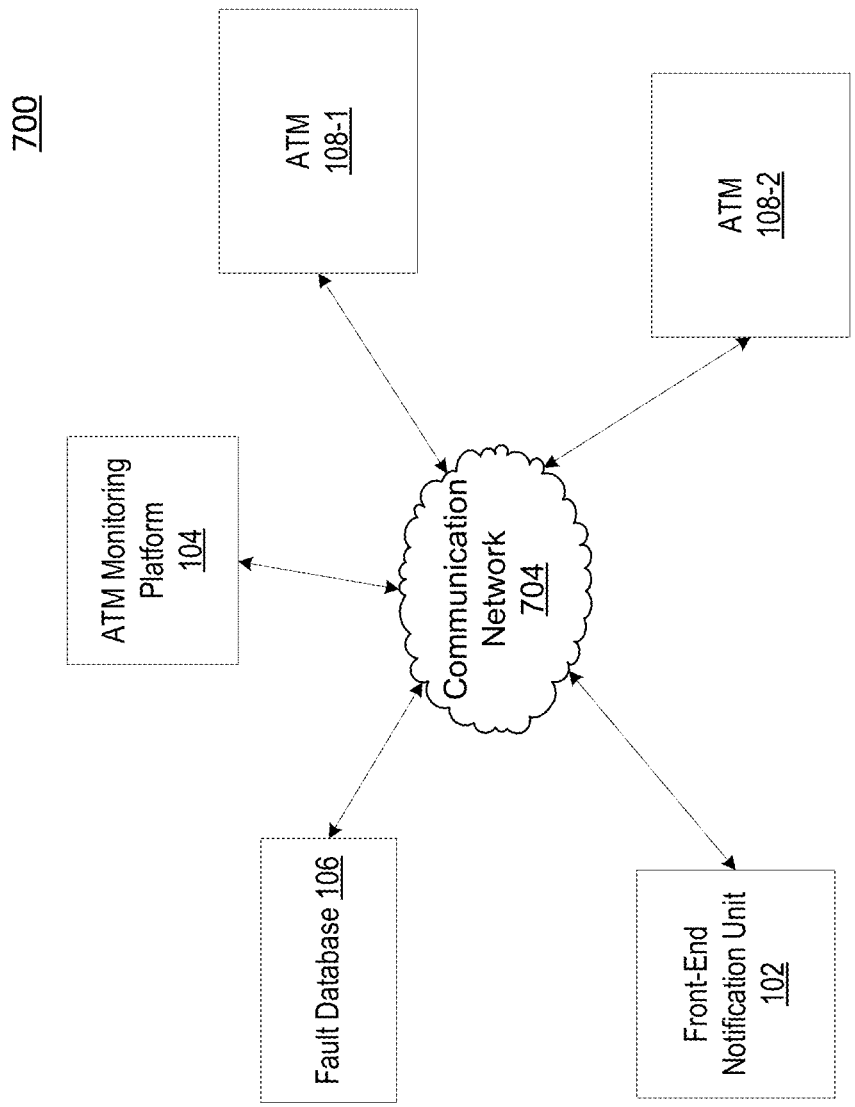
FIG. 7A shows an illustrative computing environment for an ATM fault monitoring system, in accordance with one or more example arrangements.

FIG. 7A depicts an illustrative computing environment 700 for an ATM fault monitoring system, in accordance with one or more arrangements. The computing environment 700 may comprise one or more devices (e.g., computer systems, communication devices, etc.). The computing environment 700 may comprise, for example, the ATM monitoring platform 104, the ATMs 108 in the ATM network, the fault database 106, and/or front-end notification unit 102. One or more of the devices and/or systems, may be linked over communication network(s) 704. The communication network(s) 704 may comprise public networks and/or private networks. The communication network(s) 704 may use wired and/or wireless communication protocols.

The front-end notification unit 102 may be a personal computing device (e.g., desktop computer, laptop computer) or mobile computing device (e.g., smartphone, tablet). The front-end notification unit 102 may be linked to and/or operated by an administrative user of the bank. The front-end notification unit 102 may receive data from the ATM monitoring platform 104 and the fault database 106, manipulate and/or otherwise process such data, and/or return processed data and/or other data to the ATM monitoring platform 104 and the fault database 106. The front-end notification unit 102 may be configured to control operation of the ATM monitoring platform 104.

The fault database 106 may comprise one or more computing systems and associated storage systems. The storage systems may be used for storing fault data. The storage systems may comprise one or more electronic memory devices such as tape drives, hard disk drives, optical disks, removable storage media, solid-state memory, RAM, and the like.

Figure 7B:
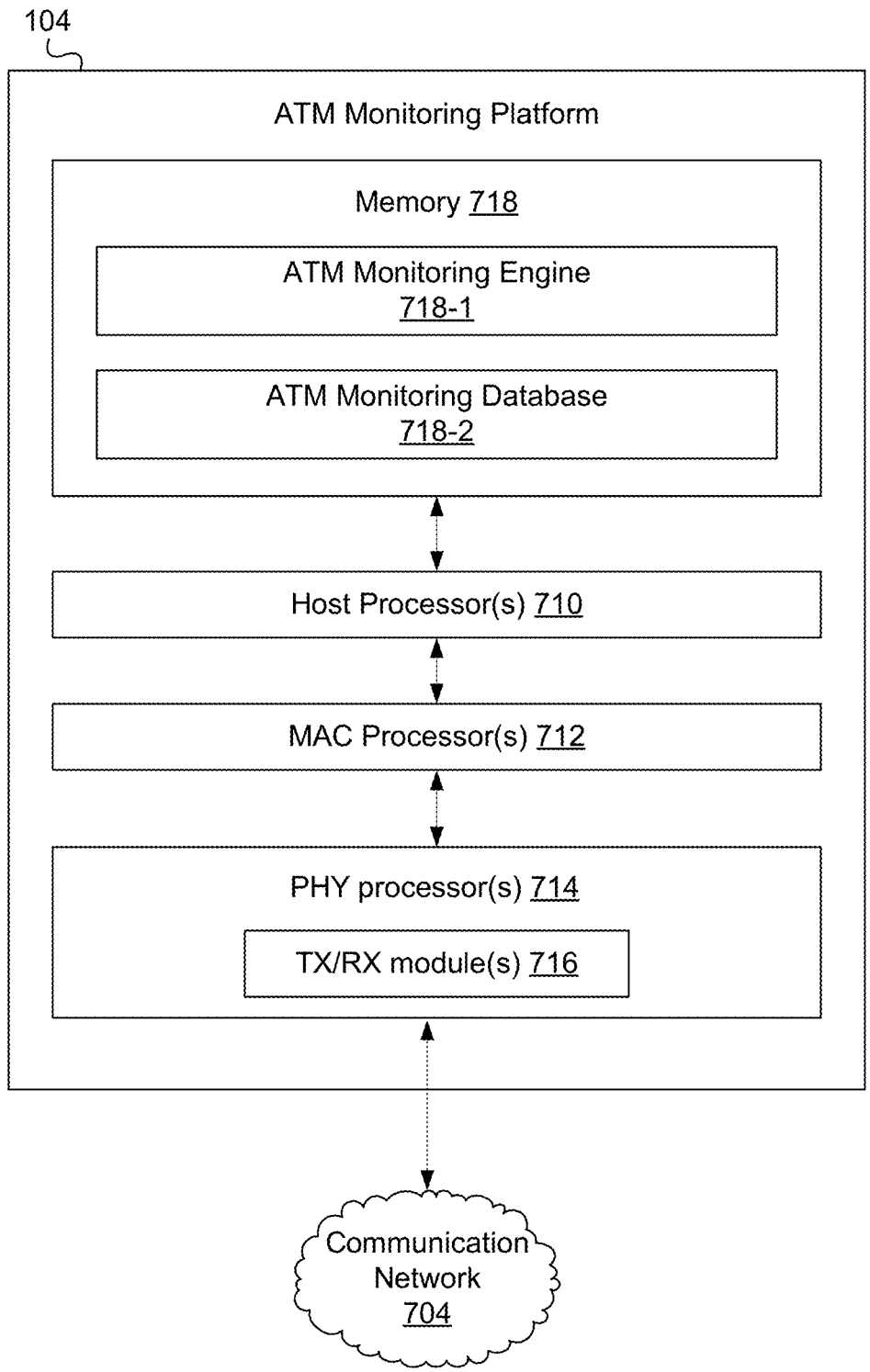
FIG. 7B shows an illustrative ATM monitoring platform, in accordance with one or more example arrangements.

FIG. 7B shows an illustrative ATM monitoring platform 104 in accordance with one or more examples described herein. The ATM monitoring platform 104 may comprise one or more of host processor(s) 710, medium transaction control (MAC) processor(s) 712, physical layer (PHY) processor(s) 714, transmit/receive (TX/RX) module(s) 716, memory 718, and/or the like. One or more data buses may interconnect host processor(s) 710, MAC processor(s) 712, PHY processor(s) 714, and/or Tx/Rx module(s) 716, and/or memory 718. The ATM monitoring platform 104 may be implemented using one or more integrated circuits (ICs), software, or a combination thereof, configured to operate as discussed below. The host processor(s) 710, the MAC processor(s) 712, and the PHY processor(s) 714 may be implemented, at least partially, on a single IC or multiple ICs. Memory 718 may be any memory such as a random-access memory (RAM), a read-only memory (ROM), a flash memory, or any other electronically readable memory, or the like.

Messages transmitted from and received at devices in the computing environment 700 may be encoded in one or more MAC data units and/or PHY data units. The MAC processor(s) 712 and/or the PHY processor(s) 714 of the ATM monitoring platform 105 are configured to generate data units, and process received data units, that conform to any suitable wired and/or wireless communication protocol. For example, the MAC processor(s) 712 may be configured to implement MAC layer functions, and the PHY processor(s) 714 may be configured to implement PHY layer functions corresponding to the communication protocol. The MAC processor(s) 712 may, for example, generate MAC data units (e.g., MAC protocol data units (MPDUs)), and forward the MAC data units to the PHY processor(s) 714. The PHY processor(s) 714 may, for example, generate PHY data units (e.g., PHY protocol data units (PPDUs)) based on the MAC data units. The generated PHY data units may be transmitted via the TX/RX module(s) 716 over the communication network 704. Similarly, the PHY processor(s) 714 may receive PHY data units from the TX/RX module(s) 717, extract MAC data units encapsulated within the PHY data units, and forward the extracted MAC data units to the MAC processor(s). The MAC processor(s) 712 may then process the MAC data units as forwarded by the PHY processor(s) 714.

One or more processors (e.g., the host processor(s) 710, the MAC processor(s) 712, the PHY processor(s) 714, and/or the like) of the ATM monitoring platform 104 may be configured to execute machine readable instructions stored in memory 718. The memory 718 may comprise (i) one or more program modules/engines having instructions that when executed by the one or more processors cause the ATM monitoring platform 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the ATM monitoring platform 104 and/or by different computing devices that may form and/or otherwise make up the ATM monitoring platform 104. For example, memory 718 may have, store, and/or comprise a ATM monitoring engine 718-1, and an ATM monitoring database 718-2. The ATM monitoring engine 718-1 may have instructions that direct and/or cause the ATM monitoring platform 718 to perform one or more operations as discussed herein. The ATM monitoring database 718-2 may store model data (e.g., determined values of $\alpha$, $\beta_i$, and $\theta_i$, etc. and/or the model parameters) corresponding to generated SARIMAX models for each fault code.

While FIG. 7A illustrates the ATM monitoring platform 104 as being separate from other elements connected in communication network 704, in one or more other arrangements, the ATM monitoring platform 104 may be included in the front-end notification unit 102. Elements in the ATM monitoring platform 104 (e.g., host processor(s) 710, memory(s) 718, MAC processor(s) 712, PHY processor(s) 714, and TX/RX module(s) 716, one or more program modules and/or stored in memory(s) 718) may share hardware and software elements with and corresponding to, for example, the front-end notification unit 102.

Figure 8:
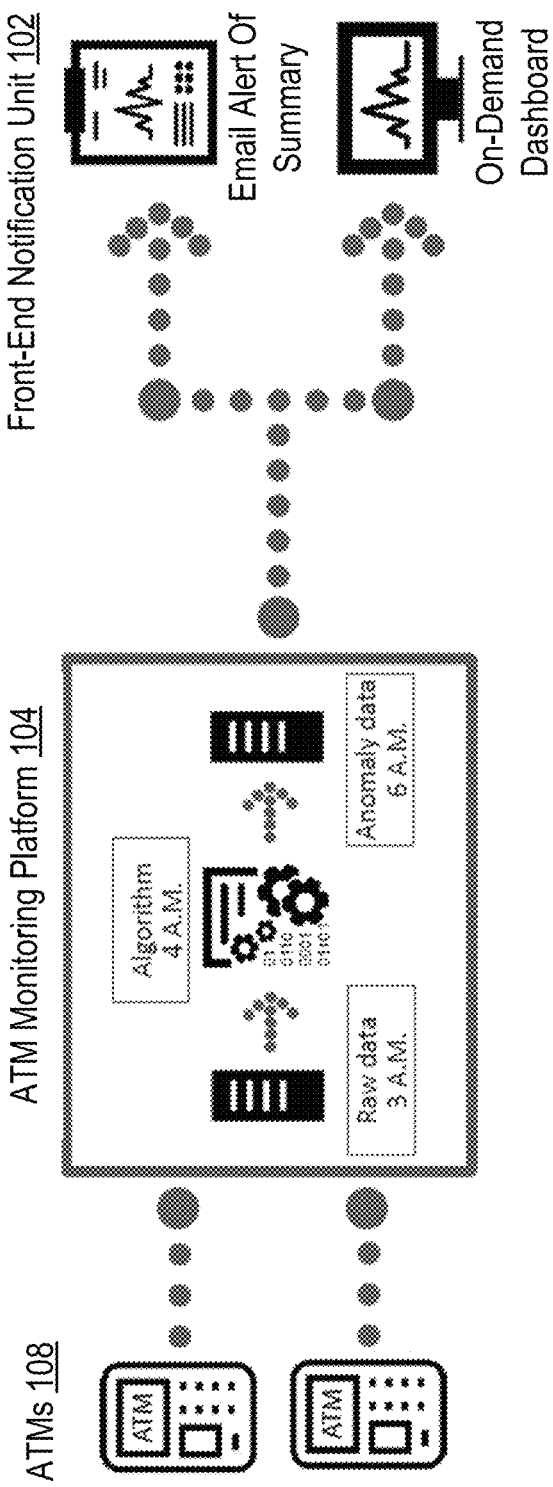
FIG. 8 shows an example operation flow of an ATM fault monitoring system, in accordance with one or more example arrangements.

FIG. 8 shows an example operation flow of an ATM fault monitoring system. The ATMs 108 may send ATM fault data to the ATM monitoring platform 104. The ATM fault data may comprise indications of fault codes associated with faults, identifiers associated with the ATMs reporting the faults, timestamps associated with the faults, etc. The ATM monitoring platform 104 may build a SARIMAX model based on historical fault volumes as observed in the ATM network. Based on the SARIMAX model, the ATM monitoring platform may predict fault volumes for a set of days (e.g., upcoming days).

The ATM monitoring platform 104 may determine, for each ATM fault code and based on the ATM fault data, corresponding fault volumes observed in the ATM network for the set of days. The ATM monitoring platform 104 may compare, for each ATM fault code, observed fault volumes with predicted fault volumes for the set of days. The ATM monitoring platform 104 may determine, based on the comparison, whether the observed fault volumes are anomalous. For example, the ATM monitoring platform 104 may begin determining observed fault volumes (e.g., for previous day(s)) in the network at 3 AM and determine anomalies at 4 AM. As described above with reference to FIG. 4, the ATM monitoring platform 104 may use various criteria to determine whether the fault volumes are anomalous.

The ATM monitoring platform 104 may generate a report for presentation at the front-end notification unit 106. The report may comprise a listing of all ATM fault codes being analyzed for anomalous behavior and may indicate the ATM fault codes that showed anomalous fault volumes in the previous day(s). The report may further indicate a type of anomaly (e.g., peak anomaly, consecutive peak anomaly, mild trend anomaly, emergent trend anomaly, etc.), a magnitude of a deviation between a predicted fault volume and an actual fault volume, ATM identifiers, software versions, geographical regions, etc. The ATM monitoring platform 104 may send the report to the front-end notification unit 106 for presentation in the form of an on-demand dashboard in a data visualization application. Additionally, or alternatively, the report may be sent in the form of an email alert. While FIG. 8 shows the ATM monitoring platform 104 detecting anomalies and generating a report once every day, in other scenarios the ATM monitoring platform 104 may be configured to detect anomalies and generate reports more frequently (e.g., once every 12 hours, once every 6 hours, etc.).

Figure 9:
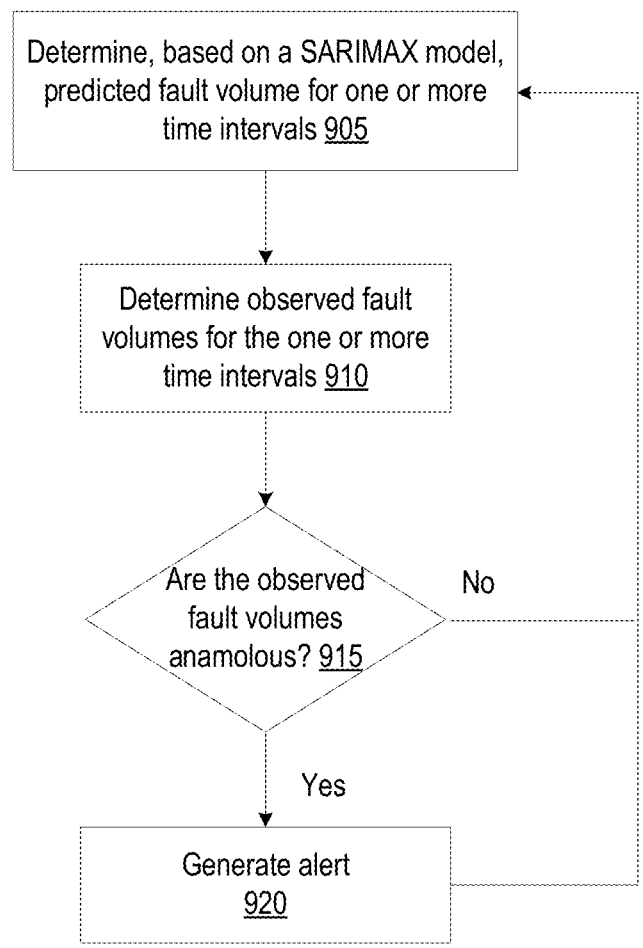
FIG. 9 shows an illustrative algorithm for determining anomalous fault behavior in an ATM network, in accordance with one or more example arrangements.

FIG. 9 shows an illustrative algorithm for determining anomalous fault behavior in an ATM network, in accordance with one or more example arrangements. At step 905, a computing platform (e.g., the ATM monitoring platform 104) comprising at least one processor, a communication interface, and memory may determine, based on a SARIMAX model, predicted fault volumes corresponding to an ATM fault code for one or more time intervals (e.g., one or more upcoming days). The computing platform may determine the predicted fault volumes based on one or more exogenous factors associated with the one or more time intervals. The exogenous factors may comprise a transaction volume (e.g., expected transaction volume) in the ATM network, a number of software upgrades (e.g., a number of ATMs in which software is scheduled to be updated), deployment days corresponding to deployment of a software upgrade, a day of the week, a month, a day of the month, a proximity to a holiday, etc.

At step 910, the computing platform may determine observed fault volumes corresponding to the ATM fault code for the one or more time intervals. The computing platform may determine the observed fault volumes based on received ATM fault data from ATMs in the ATM network. At step 915, the computing platform may determine, based on a comparison between the observed fault volumes and the predicted fault volumes, whether the observed fault volumes are anomalous. The computing platform may use procedures described above with reference to FIGS. 4-6 to determine whether the observed fault volumes are anomalous.

At step 920, the computing platform may generate an alert if the computing platform determines that the observed fault volumes are anomalous. Generating an alert may comprise generating an email alert comprising an indication of the fault code. Additionally, or alternatively, the computing platform may generate a report for presentation at the front-end notification unit 102.

Figure 10:
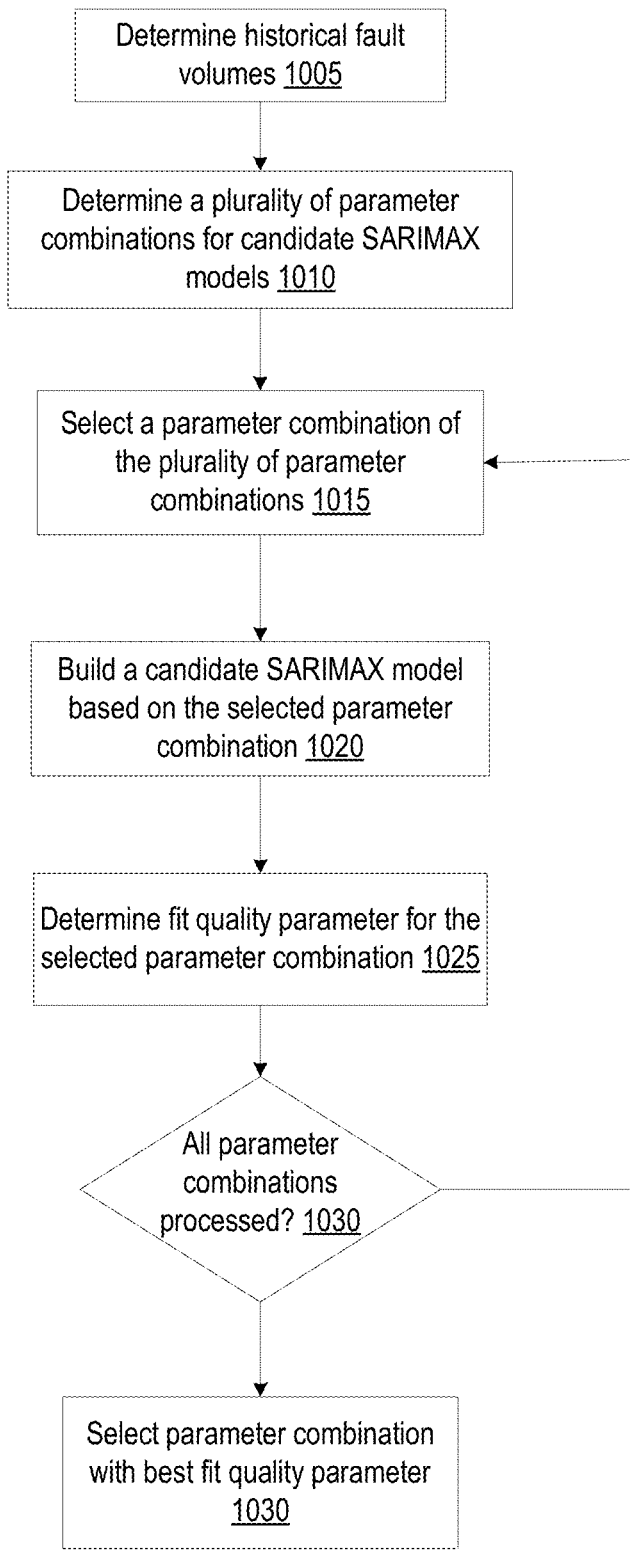
FIG. 10 shows an illustrative algorithm for selecting a parameter combination for an ATM fault model, in accordance with one or more example arrangements.

FIG. 10 shows an illustrative algorithm for selecting a parameter combination for an ATM fault model, in accordance with one or more example embodiments. At step 1005, a computing platform (e.g., the ATM monitoring platform 104) comprising at least one processor, a communication interface, and memory may determine, may determine historical fault volumes, corresponding to a fault code, for a set of time intervals.

At step 1010, the computing platform may determine a plurality of parameter combinations for candidate SARIMAX models. Each parameter combinations may correspond to a combination of values of parameters $\{p, d, q, P, D, Q, trend\}$. At step 1015, the computing platform may select a parameter combination of a plurality of parameter combinations. At step 1020, the computing platform may build, based on the selected parameter combination, a candidate SARIMAX model of the historical fault volumes. The computing platform may build the candidate SARIMAX model based on one or more exogenous factors associated with the set of time intervals. The exogenous factors may comprise a transaction volume in the ATM network, a number of software upgrades (e.g., a number of ATMs in which software was updated), deployment days corresponding to deployment of a software upgrade, a day of the week, a month, a day of the month, a proximity to a holiday, etc. At step 1025, the computing platform may determine a fit quality parameter (e.g., an AIC value) of the candidate SARMIAX model. The computing platform may repeat steps 1015-1025 for each of the plurality of parameter combinations.

At step 1030, the computing platform may select a parameter combination, among the plurality of parameter combinations, that results in a best fit quality parameter (e.g., lowest AIC value). The computing platform may use the selected parameter combination and corrected historical fault volumes (e.g., generated as described above with reference to steps 118 and 120) to build a SARIMAX model. The SARIMAX model may be used for predicting future fault volumes.

ATM fault behavior modeling, prediction, and anomaly detection as described herein may enable a banking system to efficiently and quickly identify issues in an ATM network. Generating a plurality of parameter combinations for candidate SARIMAX models and selecting a parameter combination that results in a best fit with actual fault volumes may result in improved SARIMAX models. Further, detection and replacement of outliers in historical fault data may enable improved prediction accuracy.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform for monitoring an automatic teller machine (ATM) network, comprising:
   at least one processor;
   a communication interface communicatively coupled to the at least one processor; and
   memory storing computer-readable instructions that, when executed by the at least one processor, cause the computing platform to:
      receive, corresponding to an ATM fault code and for the ATM network, observed fault volumes for a first set of time intervals;
      build, based on the observed fault volumes for the first set of time intervals, a seasonal autoregressive integrated moving average with exogenous factors (SARIMAX) model of fault volumes, wherein the building the SARIMAX model comprises:
         generating a plurality of parameter combinations corresponding to a plurality of SARIMAX models;
         building, based on the observed fault volumes in the first set of time intervals, the plurality of SARIMAX models, each associated with a corresponding parameter combination;
         calculating Akaike information criterion (AIC) values associated with each of the plurality of SARIMAX models;
         determining an intermediary SARIMAX model, among the plurality of SARIMAX models, with a lowest AIC value;
         determining, based on the intermediary SARIMAX model, that observed fault volumes in a first subset of time intervals, among the first set of time intervals, are outliers;
         generating corrected observed fault volumes for the first set of time intervals by replacing observed fault volumes in the first subset of time intervals with corrected values, and
         using, for building the SARIMAX model, the corrected observed fault volumes for the first set of time intervals and a parameter combination associated with the intermediary SARIMAX model;
      determine, based on the SARIMAX model, predicted fault volumes for a second set of time intervals;
      receive observed fault volumes for the second set of time intervals;
      determine, based on the predicted fault volumes for the second set of time intervals and the observed fault volumes for the second set of time intervals, that one or more of the observed fault volumes for the second set of time intervals are anomalous; and
      perform, based on the determining that the one or more of the observed fault volumes in the second set of time intervals are anomalous, a remedial action associated with the ATM fault code, and wherein the ATM fault codes comprise an indication of a network issue, a software issue, a mechanical issue, an inoperable cash unit issue, and a check deposit issue.

2. The computing platform of claim 1, wherein the determining that the one or more observed fault volumes for the second set of time intervals are anomalous is based on at least one of:
   a difference between an observed fault volume and a predicted fault volume for a time interval in the second set being greater than a threshold value;
   differences between observed fault volumes and predicted fault volumes for at least two time intervals of three consecutive time intervals in the second set being greater than corresponding threshold values;
differences between observed fault volumes and predicted fault volumes for at least four time intervals of five consecutive time intervals in the second set being greater than corresponding threshold values; or
differences between observed fault volumes and predicted fault volumes for at least nine consecutive time intervals in the second set being all positive or all negative.

3. The computing platform of claim 1, wherein each parameter combination of the plurality of parameter combinations comprises:
a corresponding trend autoregression order;
a corresponding trend difference order;
a corresponding trend moving average order;
a corresponding seasonal autoregressive order;
a corresponding seasonal difference order;
a corresponding seasonal moving average order;
a corresponding number of time intervals in a single season; and
a corresponding trend.

4. The computing platform of claim 1, wherein the computer-readable instructions, when executed by the at least one processor, cause the computing platform to:
determine, based on the intermediary SARIMAX model, model fit fault volumes for the first set of time intervals, wherein the determining that the observed fault volumes in the first subset of time intervals are outliers comprises determining that differences between the observed fault volumes in the first subset of time intervals and model fit fault volumes in the first subset of time intervals are greater than a threshold.

5. The computing platform of claim 4, wherein when a number of time intervals in the first subset is less than a threshold number of the number of time intervals, the corrected values are the model fit fault volumes in the first subset of time intervals.

6. The computing platform of claim 4, wherein when a number of time intervals in the first subset is greater than or equal to a threshold number of time intervals, the corrected values are sums of the model fit fault volumes in the first subset of time intervals and a standard deviation of the observed fault volumes for the first set of time intervals.

7. The computing platform of claim 1, wherein the exogenous factors comprise, corresponding to the first set of time intervals and the second set of time intervals, one or more of:
transaction volumes;
numbers of software updates performed in the ATM network;
days of week;
months;
days of month; or
proximities to a holiday.

8. The computing platform of claim 1, further comprising determining an updated SARIMAX model based on the observed fault volumes for the first set of time intervals and the observed fault volumes for the second set of time intervals.

9. The computing platform of claim 1, wherein the performing the remedial action associated with the ATM fault code comprises sending an alert message indicating the ATM fault code.

10. A method, at a computing platform comprising at least one processor, a communication interface, and memory, the method comprising:
receiving, corresponding to an ATM fault code and for an ATM network, observed fault volumes for a first set of time intervals;
building, based on the observed fault volumes for the first set of time intervals, a seasonal autoregressive integrated moving average with exogenous factors (SARIMAX) model of fault volumes, wherein the building the SARIMAX model comprises:
generating a plurality of parameter combinations corresponding to a plurality of SARIMAX models;
building, based on the observed fault volumes in the first set of time intervals, the plurality of SARIMAX models, each associated with a corresponding parameter combination;
calculating Akaike information criterion (AIC) values associated with each of the plurality of SARIMAX models;
determining an intermediary SARIMAX model, among the plurality of SARIMAX models, with a lowest AIC value;
determining, based on the intermediary SARIMAX model, that observed fault volumes in a first subset of time intervals, among the first set of time intervals, are outliers;
generating corrected observed fault volumes for the first set of time intervals by replacing observed fault volumes in the first subset of time intervals with corrected values, and
using, for building the SARIMAX model, the corrected observed fault volumes for the first set of time intervals and a parameter combination associated with the intermediary SARIMAX model;
determining, based on the SARIMAX model, predicted fault volumes for a second set of time intervals;
receive observed fault volumes for the second set of time intervals;
determining, based on the predicted fault volumes for the second set of time intervals and the observed fault volumes for the second set of time intervals, that one or more of the observed fault volumes for the second set of time intervals are anomalous; and
performing, based on the determining that the one or more of the observed fault volumes in the second set of time intervals are anomalous, a remedial action associated with the ATM fault code, and wherein the ATM fault codes comprise an indication of a network issue, a software issue, a mechanical issue, an inoperable cash unit issue, and a check deposit issue.

11. The method of claim 10, wherein the determining that the one or more observed fault volumes for the second set of time intervals are anomalous is based on at least one of:
a difference between an observed fault volume and a predicted fault volume for a time interval in the second set being greater than a threshold value;
differences between observed fault volumes and predicted fault volumes for at least two time intervals of three consecutive time intervals in the second set being greater than corresponding threshold values;
differences between observed fault volumes and predicted fault volumes for at least four time intervals of five consecutive time intervals in the second set being greater than corresponding threshold values; or
differences between observed fault volumes and predicted fault volumes for at least nine consecutive time intervals in the second set being all positive or all negative.

12. The method of claim 10, wherein each parameter combination of the plurality of parameter combinations comprises:
    a corresponding trend autoregression order;
    a corresponding trend difference order;
    a corresponding trend moving average order;
    a corresponding seasonal autoregressive order;
    a corresponding seasonal difference order;
    a corresponding seasonal moving average order;
    a corresponding number of time intervals in a single season; and
    a corresponding trend.

13. The method of claim 10, further comprising:
    determine, based on the intermediary SARIMAX model, model fit fault volumes for the first set of time intervals,
    wherein the determining that the observed fault volumes in the first subset of time intervals are outliers comprises determining that differences between the observed fault volumes in the first subset of time intervals and model fit fault volumes in the first subset of time intervals are greater than a threshold.

14. The method of claim 13, wherein, when a number of time intervals in the first subset is less than a threshold number of the number of time intervals, the corrected values are the model fit fault volumes in the first subset of time intervals.

15. The method of claim 13, wherein, when a number of time intervals in the first subset is greater than or equal to a threshold number of time intervals, the corrected values are sums of the model fit fault volumes in the first subset of time intervals and a standard deviation of the observed fault volumes for the first set of time intervals.

16. The method of claim 10, wherein the exogenous factors comprise, corresponding to the first set of time intervals and the second set of time intervals, one or more of:
    transaction volumes;
    numbers of software updates performed in the ATM network;
    days of week;
    months;
    days of month; or
    proximities to a holiday.

17. The method of claim 10, wherein the performing the remedial action associated with the ATM fault code comprises sending an alert message indicating the ATM fault code.

18. A non-transitory computer readable medium storing instructions that, when executed by at least one processor, cause:
    receiving, corresponding to an ATM fault code and for an ATM network, observed fault volumes for a first set of time intervals;
    building, based on the observed fault volumes for the first set of time intervals, a seasonal autoregressive integrated moving average with exogenous factors (SARIMAX) model of fault volumes, wherein the building the SARIMAX model comprises:
        generating a plurality of parameter combinations corresponding to a plurality of SARIMAX models;
        building, based on the observed fault volumes in the first set of time intervals, the plurality of SARIMAX models, each associated with a corresponding parameter combination;
        calculating Akaike information criterion (AIC) values associated with each of the plurality of SARIMAX models;
        determining an intermediary SARIMAX model, among the plurality of SARIMAX models, with a lowest AIC value;
        determining, based on the intermediary SARIMAX model, that observed fault volumes in a first subset of time intervals, among the first set of time intervals, are outliers;
        generating corrected observed fault volumes for the first set of time intervals by replacing observed fault volumes in the first subset of time intervals with corrected values, and
        using, for building the SARIMAX model, the corrected observed fault volumes for the first set of time intervals and a parameter combination associated with the intermediary SARIMAX model;
    determining, based on the SARIMAX model, predicted fault volumes for a second set of time intervals;
    receive observed fault volumes for the second set of time intervals;
    determining, based on the predicted fault volumes for the second set of time intervals and the observed fault volumes for the second set of time intervals, that one or more of the observed fault volumes for the second set of time intervals are anomalous; and
    performing, based on the determining that the one or more of the observed fault volumes in the second set of time intervals are anomalous, a remedial action associated with the ATM fault code, and wherein the ATM fault codes comprise an indication of a network issue, a software issue, a mechanical issue, an inoperable cash unit issue, and a check deposit issue.

* * * * *